United States Patent [19]

Michels-Krohn et al.

[11] Patent Number: 4,700,020

[45] Date of Patent: Oct. 13, 1987

[54] METHOD AND CIRCUIT ARRANGEMENT FOR THE TRANSMISSION OF DATA SIGNALS BETWEEN CONTROL DEVICES CONNECTED TO ONE ANOTHER VIA A LOOP SYSTEM

[75] Inventors: Karl-Heinz Michels-Krohn, Martinsried; Josef Untergruber, deceased, late of Nubdrof/Inn, both of Fed. Rep. of Germany, by Angela Untergruber, legal representative

[73] Assignee: Siemens Aktiengesellschaft, Berlin & Munich, Fed. Rep. of Germany

[21] Appl. No.: 900,902

[22] Filed: Aug. 27, 1986

[30] Foreign Application Priority Data

Sep. 11, 1985 [DE] Fed. Rep. of Germany ....... 3532442

[51] Int. Cl.[4] .............................................. H04L 13/16
[52] U.S. Cl. ........................................ 178/2 R; 178/3
[58] Field of Search .................. 178/2 D, 2 C, 3, 2 R; 370/41, 42, 60, 61, 85, 86, 88, 89

[56] References Cited

U.S. PATENT DOCUMENTS 4,292,623  9/1981  Eswaran et al. ..................... 178/3 X
4,340,776  7/1982  Ganz et al. ................................ 178/3

FOREIGN PATENT DOCUMENTS 0150084  2/1985  European Pat. Off. .
3136586  3/1983  Fed. Rep. of Germany .

Primary Examiner—Stafford D. Schreyer
Attorney, Agent, or Firm—Hill, Van Santen, Steadman & Simpson

[57] ABSTRACT

A data transmission system has a number of control devices connected via a transmission loop. Each control device includes signal processing circuitry which compiles data signals to be transmitted in the form of a data signal block. The signal processing circuitry is followed by a transmit buffer, which includes a write/read memory. A prepared data signal block can be accepted into this memory. A counter is connected to the memory which continuously addresses the memory for accepting a data signal block, and for emission thereof to the loop upon the appearance of a transmit authorization signal. The write/read memory is followed by a register. In addition to memory locations for accepting a data signal word, this register additionally includes memory locations for auxiliary information to be attached to the individual data signal words. The auxiliary information is derived from counter readings of the counter.

10 Claims, 5 Drawing Figures

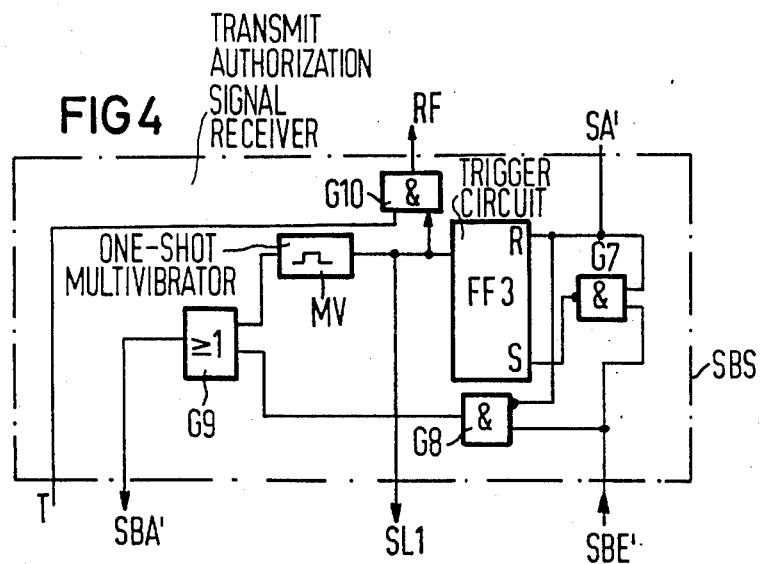
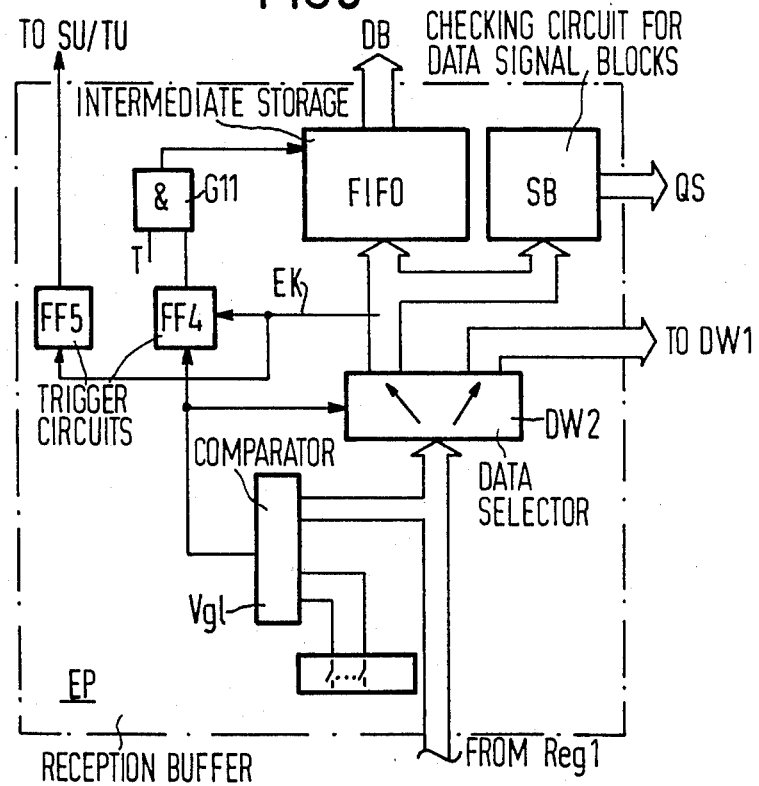

METHOD AND CIRCUIT ARRANGEMENT FOR THE TRANSMISSION OF DATA SIGNALS BETWEEN CONTROL DEVICES CONNECTED TO ONE ANOTHER VIA A LOOP SYSTEM

BACKGROUND OF THE INVENTION

1. Field of the Invention

The invention relates to a method and to a circuit arrangement for the transmission of data signals between control devices connected to one another via a clock-controlled loop system operated directionally dependent.

2. Related Applications

The present application is related to the following applications, all filed simultaneously herewith: Ser. No. 900,900 (Kerschner, Michels-Krohn, UnterGruber); Ser. No. 900,901 (Kerschner, Michels-Krohn, Unter-Gruber); Ser. No. 900,904 (Michels-Krohn, Unter-Gruber) and Ser. No. 900,908 (Michels-Krohn, Unter-Gruber).

3. Description of the Prior Art

Data transmission systems are known wherein the control devices are control devices of a data switching system, whereby a transmit authorization signal respectively driving the control devices into a transmit authorized status is transmitted via the loop system from control device to control device. Data signals to be transmitted by the respective control device are output to the loop system together with a receiver address identifying a desired control device before the transmit authorization signal is forwarded from the respective control device. A control device which is identified by the receiver address transmitted together with the data signals accepts these data signals for further processing and emits an acknowledgement signal to be forwarded via the loop system, the acknowledgement signal being provided for that control means situated in an acknowledgement reception status from which the data signals had been output.

A circuit arrangement of the species just cited is already known (German OS No. 31 36 586). This known circuit arrangement comprises a transmitter arrangement composed of a reception and transmission control means and of an operations control means. For the initiation of a transmission event, the transmitter arrangement compiles the data signals to be transmitted to form a data signal block, carrying this out with the assistance of the reception and transmission control means and of the operations control means, whereby a receiver address and a sender address are attached to the actual data signals. Upon arrival of a transmit authorization signal, such a data signal block is then subsequently emitted onto the loop system before said transmit authorization signal is forwarded. The circuit-oriented realization of the transmitter arrangement is not set forth in greater detail in the said OS.

SUMMARY OF THE INVENTION

It is an object of the present invention to provide a data transmission system, and a method for operating this system, wherein each control device, which can act as a transmitter or a receiver, has the capability when functioning as a transmitter to insert auxiliary information in data signal blocks which are ready for transmission via the loop, before the blocks are transmitted.

It is another object of the present invention to provide such a method and system wherein the insertion of the auxiliary information can be undertaken with minimal circuit outlay.

A further object of the present invention is to provide such a method and system wherein the working speed of the individual control devices can be adapted to the transmission rate of the loop system.

The above objects are achieved in accordance with the principles of the present invention in a transmission system wherein every control device includes a signal processing means which compiles the signals to be transmitted by that control device in the form of at least one data signal block. The data signal block consists of data signals plus at least one receiver address and a sender address. The data signals are in the form of at least one data signal word having a prescribed plurality of bits. Each signal processing means is followed by a transmit buffer which includes a write/read memory having a plurality of storage cells for word-by-word acceptance of a compiled data block. A counter is connected to the write/read memory which continuously addresses the storage cells for word-by-word acceptance of the data signal block proceeding from a prescribed initial counter reading. The counter addresses storage cells based on a measure of the counter reading, which changes with pulses from a write clock corresponding to the operating speed of the signal processing means. Addressing of the write/read memory is stopped at a counter reading established by the length of the respective data signal block. In response to receipt of a transmit authorization signal, transmitted from control device to control device via the loop, and proceeding from the aforementioned initial counter reading, the counter enables a word-by-word read-out of the data signal block stored in the write/read memory. During read-out of the memory, the count of the counter changes corresponding to the working speed of the loop system up to the count at which addressing of the memory was stopped. The write/read memory is followed by a register, which in addition to memory locations for accepting a data signal block, has memory locations for auxiliary information to be attached to the data signal words comprising the data signal block. The auxiliary information is derived from the counter readings of the counter.

The method and system disclosed herein have the advantage that processing of the data signals to be transmitted, and control of the transmission of the signals, are executed in separate devices in that portion of the control device which functions as a transmitter. Compilation of the signals is undertaken in the signal processing means, and transmission of the signals is undertaken by the transmitter buffer. The signal processing means is thereby dynamically relieved as a result of this functional separation. For example, the signal processing means is already available for a renewed compilation of data signals after emitting a compiled data signal to the transmit buffer in the form of a data signal block. The subsequent transmission of the data signals via the loop system is then assumed exclusively by the transmit buffer. The advantage of this transmit buffer is that both acceptance of data signls into the write/read memory and subsequent forwarding thereof to the loop conductor, as well as attachment of auxiliary information to the individual data signals to be forwarded, are controlled by the counter. No separate devices are additionally required for attaching the auxiliary information.

Identifier bits respectively signifying the start and end of a data signal block are preferably provided as the auxiliary information. Their appearance in a defined binary status is determined respectively by the initial counter reading and the maximum counter reading, i.e., the counter count at which addressing of the write/read memory stopped.

The circuit outlay for the counter can be kept especially low by providing a write/read counter and a contents counter. For the word-by-word acceptance or read-out of a data signal block proceeding from the perscribed initial counter reading, which defines the binary status of the identifier bit signifying the start of a data block, the write/read counter effects continuous addressing of the memory cells of the write/ read memory. Proceeding from an initial counter reading indicating the empty status of the write/read memory, the contents counter increments its count with each acceptance of a data signal word into the write/read memory, and retains its counter reading established by the respected data signal block length. This contents counter reading is a measure for the counter reading of the write/read counter which has been reached. During the subsequent read-out of data signal words from the write/read memory, the count of the contents couner is decremented proceeding from the previously reached count of the contents counter, until the initial counter reading is reached. Upon re-attaining the initial counter reading, the write/read counter is deactivated, and the identifier bit signifying the end of the data signal block is provided with a specific binary status.

The signal processing means, given the above circuit arrangement, is preferably a microprocessor arrangement.

The invention shall be set forth in greater detail below with reference to drawings, by way of example.

DESCRIPTION OF THE DRAWINGS.

FIG. 4 shows the structure of a device for the reception of a transmit authorization signal.

FIG. 5 shows the structure of a reception buffer arrangement present in the interface circuits.

DESCRIPTION OF THE PREFERRED EMBODIMENTS

Figure 1:
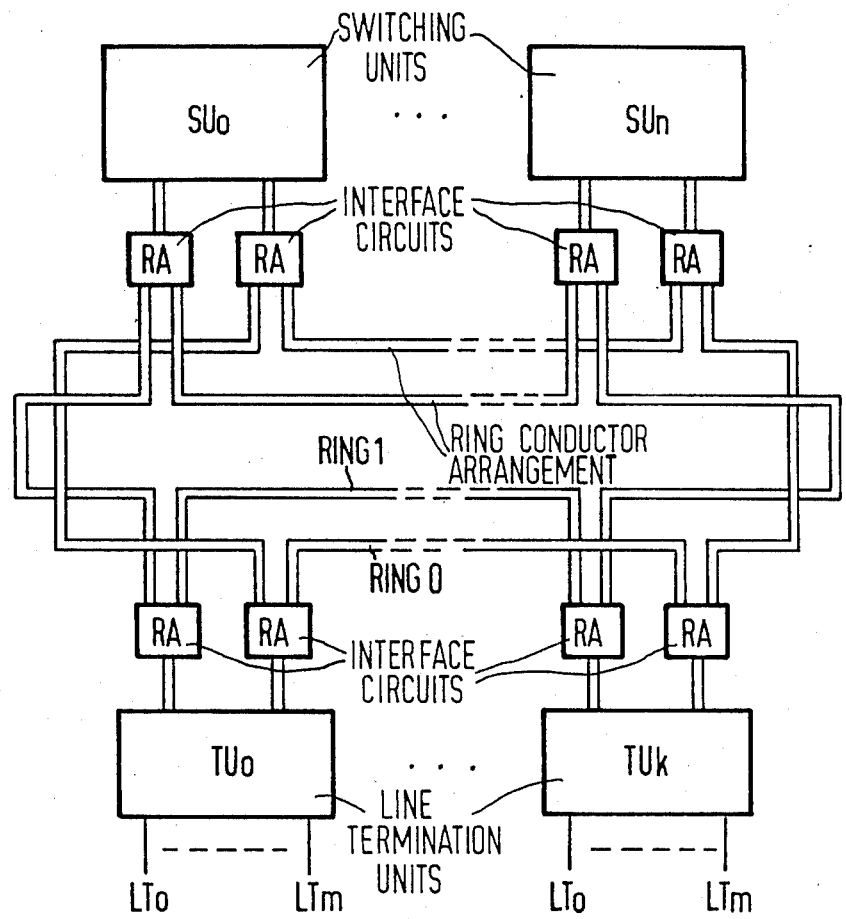
FIG. 1 shows a block circuit diagram of a data switching system formed of a loop system in which the invention is used.

FIG. 1 shows a data switching system having a plurality of switching units SUo through SUn. These switching units execute the switching functions required for the transmission of data signals, based on the load division principle. The switching units are connected in common to a loop system for this purpose. Such a loop system can be composed of a single, closed loop conductor arrangement. Such a loop system, however, for example, as shown in FIG. 1, can also be constructed of two ring conductor arrangements RING0 and RING1 proceeding parallel to one another which are independent of one another. Given, for example, an outage of one of the ring conductor arrangements, such a redundancy makes it possible to execute the transmission of data signals on the other ring conductor arrangement.

The connection of the switching units SUo through SUn to the two ring conductor arrangments respectively ensues via a separate interface circuit RA for each of the ring conductor arrangements, this interface circuit RA being discussed in greater detail below.

Line termination units TUo through TUk are also connected to the ring conductor arrangements RING0 and RING1, also respectively connected thereto via a separate interface circuit RA for each of the ring conductor arrangements. Together with the associated interface circuits, these line termination units serve for data signal transmission between the switching units and transmission lines connected to subscriber devices, these transmission lines being connected to the line termination units. For such a connection of transmission lines, each of the line termination units has a plurality of line terminations LTo through LTm.

The circuit units formed by the said switcing units or the line termination units and the associated interface circuits shall be referred to below as control devices. If the loop system is composed only of a single ring conductor arrangement, only a single interface circuit belongs to a control device.

Within the switching system shown in FIG. 1, i.e. between the switching units and the line termination units, transmission of data signals ensues in the form of data signal blocks which, as data signals in the course of the set-up of the connection, comprise respective signalling information and, given a set-up connection, comprise the message signals to be communicated between the subscriber equipment coming into consideration. In addition to the actual data signals which are respectively formed of a plurality of bits, for example 8 bits, each data signal block to be transmitted contains at least one receiver address identifying a control device selected as the receiver, start and end identifiers indicating the start and end of a data signal block, a transmitter address identifying the respective control device as the transmitter, and a prepared acknowledgement signal. A data signal block constructed in such fashion can be output to one of the ring conductor arrangements by a control device only when this control device has previously received a transmit authorization signal transmitted from control device to control device which respectively drives each device receiving this signal into a transmit status.

Figure 2:
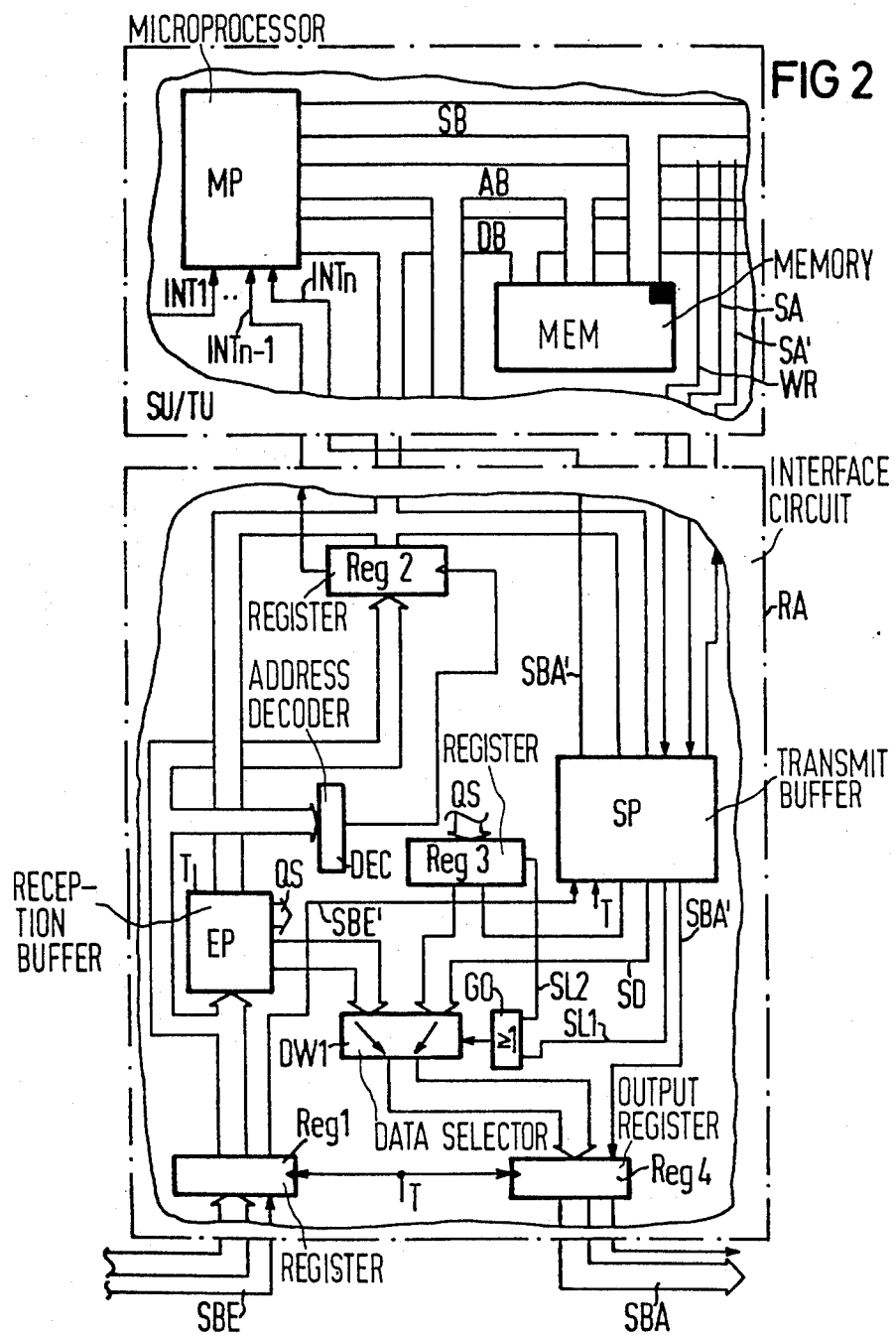
FIG. 2 shows a block circuit diagram of the structure of one of the interface circuits shown schematically in FIG. 1 and of the structure of one of the switching or line termination units.

FIG. 2 shows the structure of a control device in greater detail. As already mentioned above, such a control device is composed either of a switching unit or of a line termination unit indicated in FIG. 2 by the reference SU/TU and of a plurality of interface circuits corresponding in number to the plurality of ring conductor arrangements. Only one of these interface circuits is shown in FIG. 2, since all of the interface circuits connected to the switching units or line termination units internally comprise the same structure.

Each unit (switching unit or line termination unit) referenced SU/TU in FIG. 2 and shown by way of excerpt therein comprises a microprocessor arrangement controlling both transmit as well as receive events. Of this microprocessor arrangement, a microprocessor MP and a memory arrangement MEM comprising read-only memories (program memories) and write/read memories, which is connected to said microprocessor MP via a bus system, are shown. The bus system includes a data bus DB and address bus AB and a control bus SB. The interface circuit RA is in communication with the microprocessor MP via the data bus and the address bus as well as via the lines of the control bus referenced WR and SA. Further, two control lines of the interface circuit lead to interrupt inputs INTn-1 and INTn of the microprocessor MP.

The interface circuit RA can be divided into two circuit parts, namely into a transmit part for the emission of data signal blocks to the ring conductor arrangement and a receive part of the acceptance of data signal blocks from the ring conductor arrangement. The receive part shall be discussed first below.

A reception register Reg1 is provided at the interface to the ring conductor arrangement, signals transmitted in parallel form via the ring conductor arrangement being transferred into the reception register Reg1 under the control of a clock generator (not shown) which emits clock pulses T. The clock pulse sequence, moreover, is matched to the transmission rate on the ring conductor arrangement. The signals are a prescribed plurality of data signals and a transmit authorization signal which is transmitted on a separate line referenced SBE. This transmit authorization signal can be formed by a prescribed status of a binary signal which appears for a defined time duration.

The outputs of the input register Reg1 carrying the data signals are connected to a reception buffer arrangement EP and to an acknowledgement signal receiver. The latter is formed of an address decoder DEC and an acknowledgement register Reg2. At their input sides, both are in communication with the outputs of the input register Reg1. The output of the address decoder DEC is connected to a clock input of the acknowledgement register Reg2. This acknowledgement register Reg2 in turn has data signal outputs which are connected to the data bus DB. A control line of the acknowledgement register Reg2 leads to the interrupt input INTn-1 of the microprocessor MP.

As shall be set forth in greater detail below, the reception buffer arrangement EP serves for the acceptance of data signal blocks intended for the respective control device and for the forwarding of data signal blocks intended for other control devices connected to the ring conductor arrangement. At its output side, this reception buffer arrangement is connected to the data bus DB and to first inputs of a data selector DW1, and is also connected via a line arrangement QS to inputs of a register Reg3.

The transmit part of the interface circuit Ra includes a transmit buffer arrangement SP which is supplied with signals by the microprocessor arrangement via the data bus DB, the address bus AB and via the lines WR and SA of the control bus SB. Further, an input of the transmit buffer arrangement is connected to that output of the input register Reg1 carrying the transmit authorization signal, being connected thereto via a line referenced SBE'. Finally, the transmit buffer arrangement SP is supplied with the clock signals T at a further input.

The transmit buffer arrangement SP has data signal outputs connected to further inputs of the data selector DW1, connected thereto via a line arrangement SD. Among other things, this data selector is controlled by a control signal appearing on a line referenced SL1, being controlled proceeding from the transmit buffer arrangement. The data selector therefore has a control input connected to the line Sl1 via an OR element GO.

The register Reg3 which has its input side connected to the line arrangement QS also has its data signal outputs connected to the inputs of the data selector DW1. A control output of this register is connected to the control input of the data selector DW1, being connected thereto via a line referenced SL2 and via the OR element GO.

At its output side, the data selector DW1 is connected to data signal inputs of an output register Reg4 provided at the interface to the ring conductor arrangement, this output register Reg4 being controlled by the clock pulses T. This register Reg4 has a further input connected to an output of the transmit buffer arrangement SP carrying a transmit authorization signal to be forwarded, being connected thereto via a line referenced SBA'. At its output side, the output register Reg4 is connected to the ring conductor arrangement. The line SBA', moreover, is also connected to the interrupt input INTn of the microprocessor MP. Finally, the transmit buffer arrangement is also in communication with the control bus SB via a line SA'.

It will be understood that the reception buffer arrangement EP and the acknowledgement register Reg2, in addition to being in communication with the data bus DB, are also in communication with the address bus AB and the control bus SB and a drive proceeding from the microprocessor MP. The respective connections, however, are not shown for the purpose of simplifying FIG. 2.

In the following, the interaction of the circuit parts shown in FIG. 2 in the transmission of data signals shall be explained first, before the structures of the reception buffer arrangement EP and of the transmit buffer arrangement SP are discussed in greater detail.

It is first assumed that data signals are to be transmitted from the control device shown in FIG. 2 to another control device. For this purpose, the microprocessor arrangement first compiles the data signals respectively composed of a prescribed plurality of bits to form at least one data signal block. The actual data signals are preceded by a receiver address identifying the control device selected as receiver. Controlled by write pulses transmitted via the line WR, a data signal block compiled in this fashion is subsequently transmitted word-by-word into the transmit buffer arrangement SP. What is to be understood by a word is a prescribed plurality of bits which are simultaneously transmitted to the transmit buffer arrangement in the form of a parallel character. For example, a word can be composed of 16 bits, i.e. of two data signals when each data signal is composed of 8 bits.

After the word-by-word transmission of a data signal block, the microprocessor arrangement then emits a transmit request signal to the transmit buffer arrangement SP via the line Sa. Until the appearance of a transmit authorization signal which proceeds to the transmit buffer arrangement SP via the input register Reg1 and the line SBE', the data signal block initially remains unconsidered in the transmit buffer arrangement SP. After the appearance of a transmit authorization signal, however, the data signal block now stored in the transmit buffer arrangement SP is emitted word-by-word to the appropriate ring conductor arrangement via the output register Reg4. An end identifier indicating the end of a data block and a sender address indicating the control device sending the data signal block are thereby also attached to the data signal block, as is an acknowledgement signal prepared for the receiver. Following thereupon, the transmit buffer arrangement SP then forwards the previously received transmit authorization signal via the line SBA' to the output register Reg4 which emits this transmit authorization signal to the ring conductor arrangement.

After the emission of the transmit authorization signal, this being communicated to the microprocessor MP by a signal on the line SA', the control device first transfers into an acknowledgement reception status in which only reception events can be executed and in which the interrupt input INTn of the microprocessor is enabled.

In the normal case, the acknowledgement reception status is maintained up to the arrival of an acknowledgement signal which is emitted by the control device coming into consideration as receiver in response to the reception of a data signal block now transmitted. The acknowledgement signal is the aforementioned, prepared acknowledgement signal transmitted in the data signal block which is modified in the control device coming into consideration as receiver. As a result of this modifying, the transmitter is supplied with information relating to the reception of the transmitted data signal block. For example, the faultless transmission of a data signal block can be indicated by an acknowledgement signal modified in a certain way.

Attached to a modified acknowledgement signal are the address of the sender of the data signal block just received and the end identifier belonging to the data signal block. The address and the end identifier are thereby taken from the received data signal block.

The appearance of an acknowledgement signal is now monitored with the assistance of the aforementioned acknowledgement signal receiver. For this purpose, the address decoder DEC associated therewith constantly compares the signals appearing at the output of the input register Reg1 (FIG. 2) to a signal composed of the address allocated to the control device and of the declared end identifier. When the address decoder thereby identifies coincidence, then it emits a control signal at its output. With the appearance of this control signal, the acknowledgement signal transmitted following upon the address and the end identifier is transferred into the acknowledgement register Reg2.

In response to the acceptance of the acknowledgement signal, the acknowledgement register emits an acknowledgement confirmation signal to the microprocessor MP via its control output. The microprocessor MP subsequently accepts the acknowledgement signal now stored in the acknowledgement register, for a subsequent interpretation. In the course of this interpretation, the microprocessor MP transfers the control device from the acknowledgement reception status into a status in which a renewed emission of a data signal block is possible. Whether a potentially further data signal block pending for a transmission is transmitted or whether measures for error handling such as, for example, measures for renewed transmission of the previously output data signal block, are initiated first given a recognized transmission error depends on the inerpretation of the acknowledgement signal. Moreover, the interrupt input INTn is inhibited in this status. The arrival of the transmit authorization signal is constantly monitored in the control device, namely in the appertaining transmit buffer arrangement SP. In response to the appearance of the transmit authorization signal, this emits a control signal to the transmit authorization signal, this emits a control signal to the interrupt input INTn of the microprocessor MP. If the acknowledgement signal expected by a control device now situated in an acknowledgement reception status has not arrived in this control device before the emission of this control signal, then the microprocessor MP transfers the control device into an error reporting status and/or error handling status. In this status, measures for error handling may be initiated in addition to an error report. The consequence of these, for example, is that all devices of the switching system involved in the transmission of the non-acknowledged data signal block, i.e. the two control devices coming into consideration and the ring conductor arrangement used for the transmission are checked step-by-step. When this check thereby shows, for example, that the ring conductor arrangement or the interface circuits RA connected to it do not operate faultlessly, then the error handling can be a switch to the hitherto unused ring conductor arrangement for the transmission of data signal blocks. When, by contrast, central parts of the control devices involved in the transmission do not operate error-free, then the error handling can exclude the control device from a further data signal transmission.

Control events occurring in sequence upon reception of a data signal block in a control device shall now be set forth. As already mentioned above, the reception buffer arrangement EP is provided for the acceptance of data signal blocks. Upon appearance of a start identifier identifying the start of a data signal block, this reception buffer arrangement EP compares the receiver address transmitted at the beginning of the data signal block to an address assigned to the appertaining control device. Given a coincidence of the addresses compared to one another, the signals belonging to the data signal block are accepted into a memory arrangement up to the appearance of an end identifier indicating the end of the data signal block. They initially remain therein until acceptance by the microprocessor arrangement of the unit SU/TU (FIG. 2). The transfer can thereby ensue, for example, in response to a control signal emitted by the reception buffer arrangement given appearance of the end identifier. For this purpose, the control signal can be supplied to the microprocessor MP at a further interrupt input, for example the input INT1.

Before the transfer of a data signal block, a check regarding a faultless transmission in, for example, the form of a parity check is first carried out in the reception buffer arrangement EP. The reception buffer arrangement EP thereby modifies the acknowledgement signal transmitted in the data signal block and prepared by the sender of the data signal block, in accord with the check result, and transmits this modified acknowledgement signal to the register Reg3 together with the address identifying the sender of the data signal block just received and together with the end identifier. The end identifier and address are thereby taken from the received data signal block. The register Reg3 then forwards the accepted signals to the ring conductor arrangement, via the data selector DW1 and the output register Reg4. For this purpose, the data selector DW1 is correspondingly controlled by the register Reg3 via the line SL2.

When, by contrast, the reception buffer arrangement EP identifies a non-coincidence of the addresses compared to one another given the appearance of a start identifier of a data signal block, then this reception buffer arrangement EP forwards this data signal block to the data selector DW1 unmodified. Via this data selector and the following output register Reg4, the data signal block then again arrives onto the ring conductor arrangement and, thus, to the control device following in the ring conductor arrangement.

Figure 3:
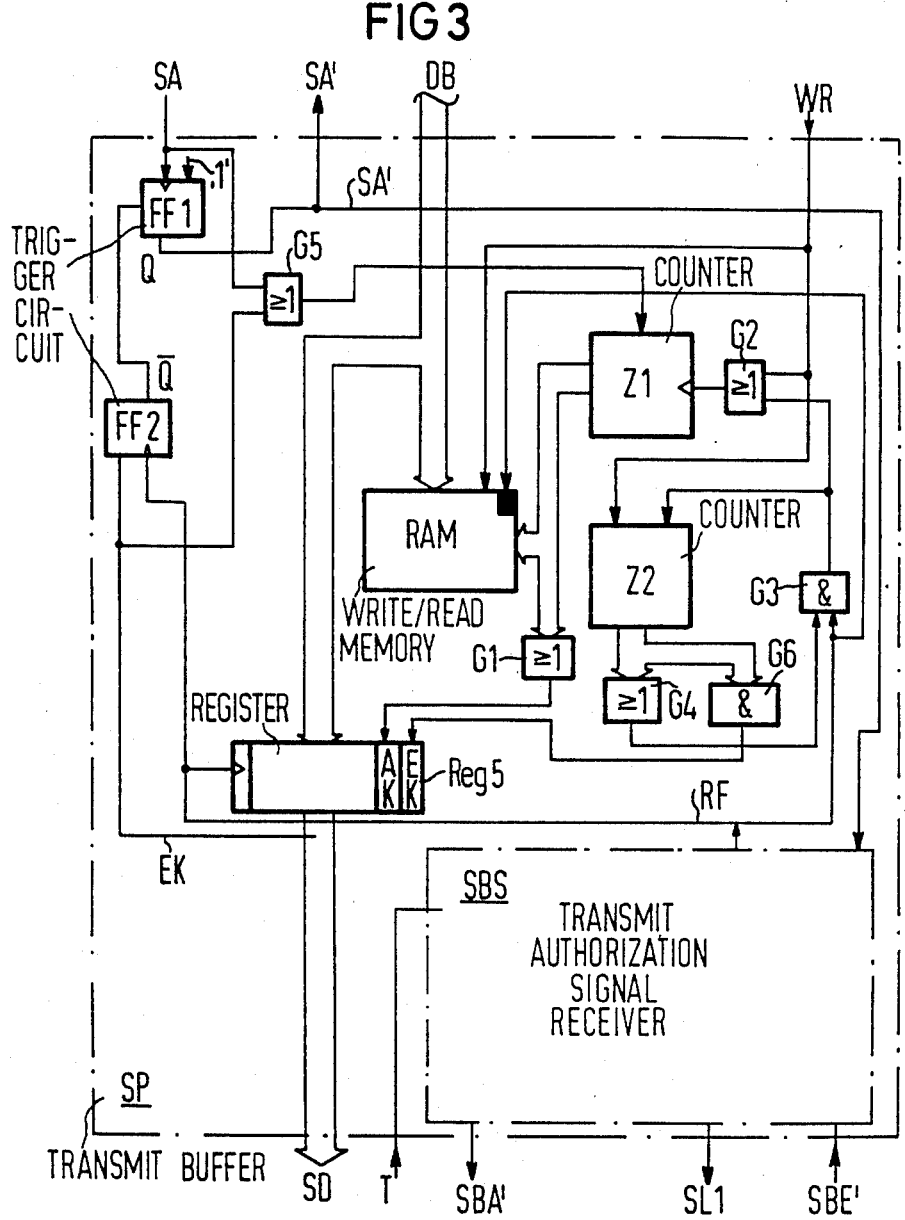
FIG. 3 shows the structure of a transmission buffer arrangement present in the interface circuits.

In the following, the structure of the transmit buffer arrangement SP and of the reception buffer arrangement EP shall also be discussed. FIG. 3 shows a block circuit diagram of the transmit buffer arrangement. Among other things, it includes a write/read memory RAM which has its data signal inputs connected to the data bus DB. This write/read memory RAM serves for the aforementioned word-by-word acceptance of a data signal block offered by the microprocessor arrangement of the unit SU/TU and serves for the forwarding thereof to the ring conductor arrangement in response to the appearance of a transmit authorization signal. For the write/read events required for this purpose, the write/read memory RAM is supplied with write-in pulses via the line WR and is supplied with read-out pulses via a line RF. The memory RAM is also controlled by a counter means which includes two counters Z1 and Z2. The counter Z1 is a write/read counter for continuous addressing of the storage cells in the write/read memory RAM. The counter Z1 has its outputs connected to address inputs of the write/read memory RAM and to inputs of an OR element G1. The counter Z1 is supplied with signals from an OR element G2 at a clock input. The OR element G2 is connected to the line WR at one of its inputs, and has another input connected to the output of an AND element G3. One input of the AND element G3 is in communication with a transmit authorization signal receiver SBS via the line RF. The receiver SBS is connected to the lines T, SBE', SBA' and SL1 shown in FIG. 2.

A further input of the AND element G3 is connected to an output of an OR element G4, which has its input side connected to counter outputs of the counter Z2. The counter Z2 is a bi-directional counter, which is used as a contents counter for the write/read memory RAM. The contents counter has a separate clock input for counting in the forward direction and in the backward direction. For counting in the forward direction, the counter Z2 is supplied with clock signals via the line WR. For counting in the backward direction, the counter Z2 is supplied with clock signals via the AND element G3.

The transmit buffer SP shown in FIG. 3 also includes a register Reg5. This register Reg5 has its input side in communication with the data bus DB and with outputs of the OR element G1, and with an AND element G6. The AND element G6 has its input side connected to the counter outputs of the counter Z2. The OR element G1 is connected to the register cell AK of the register Reg5, and the AND element G6 is connected to the register cell EK. The register Reg5 is supplied with clock signals at a clock input via the line RF. The ouput of the register Reg5 is connected to the line SD.

The transmit buffer SP also includes a trigger circuit FF1 which, via a line SA', is in communication at its output side with the transmit authorization signal receiver SBS and with the control bus SB. The trigger circuit FF1 has its clock input connected to the line SA shown in FIG. 2. A data signal input of the trigger signal FF1 is fixed at the logic level "1." A reset input of the trigger circuit FF1 is connected to an output of a further trigger circuit FF2. The clock input of the trigger circuit FF2 is supplied with clock signals from the receiver SBS via the line RF. The trigger circuit FF2 has a data signal input connected to a line EK of the line arrangement SD, which carries the end identifier. The line EK, and the aforementioned line SA, are also connected to an OR element G5, which is in communication at its output side with a reset input of the counter Z1.

The following control events occur in sequence in the transmit buffer SP shown in FIG. 3. For word-by-word transfer of a data signal block into the write/read memory RAM, write-in pulses corresponding to the working speed of the microprocessor MP are supplied to the memory RAM and to the two counters Z1 and Z2 via the line WR. The count of the counter Z1 is continually incremented as a result of these write-in pulses, proceeding from an initial counter reading which may be assumed to be a count of "0." The continually changing count is supplied to the memory RAM as an address for addressing the storage cells of the memory RAM, so that successive data signal words of the data signal block being transferred are accepted into successive storage cells.

At the same time, the count of the contents counter Z2 is also continually incremented with each write-in pulse. This incrementation also proceeds from an initial counter reading, indicating the empty status of the write/read memory RAM. This initial counter reading can again assume to be a count of "0." The momentary count of the contents counter Z1 thus identifies that storage cell into which a data signal word may be entered. The momentary counter reading is retained until another write-in pulse occurs. After transfer of the complete data signal block into the memory RAM, the contents counter Z2 has a count established by the length of the data signal block. The count will correspond to the count of the write/read counter Z1 which has also been reached at this stage.

After transfer of a data signal block into the memory RAM, the microprocessor MP emits a transmit request signal via the line SA. The transmit request signal is supplied to the write/read counter Z1 via the OR element G5. This transmit request signal resets the counter Z1 to a condition whereby the counter Z1 again supplies the initial counter reading at its output. The transmit request signal also transfers the trigger circuit FF1 to an active status. As a result of this active status, the transmit authorization signal receiver SBS is informed of the existence of a data signal block to be transmitted. When the receiver SBS subsequently receives a transmit authorization signal from the transmission loop, the receiver SBS emits read-out pulses via the line RF in the form of clock pulses T corresponding to the transmission rate of the loop system. These read-out pulses are directly supplied to the memory RAM, and are supplied to the two counters Z1 and Z2 via the AND element G3, which is switched to a conductive state by the OR element G4. The register Reg5 and the trigger circuit FF2 are also supplied with these read-out pulses.

The read-out pulses effect read-out of the data signal words stored in the memory RAM, and the transfer thereof into the register Reg5. This read-out is begone with a data signal word which is stored in the storage cell of the memory RAM corresponding to the initial count of the couter Z1. This data signal word may, for example, be the receiver address which precedes the actual data signals. With the transfer of this first word of the data signal block into the register Reg5, an identifier bit, signifying the beginning of this data signal block, is set at a defined binary state which may, for example, be the logic state "0." This setting is caused by a signal at the output of the OR element G1 upon the occurrence of the initial counter reading at the output of the counter Z1. The register cell AK of the register Reg5 is reserved for this block start identifier bit.

In addition to the block start identifier bit, another identifier bit is provided for signifying the end of a data signal block. The register cell EK of the register Reg5 is reserved for this identifier bit. Both of the identifier bits are attached to each of the data signal words transferred into the register Reg5, however, only the identifier bit signifying the beginning of a data signal block is initially set upon transfer of the first data signal word. Neither of the two identifier bits is initially set for the data signal words following the first data signal word.

Upon the occurrence of each read-out pulse, the count of the counter Z1 is incremented, so that the memory RAM is supplied with continual addresses for read-out of the data signal words stored therein, in the same sequence in which the addresses for write-in of the data signal words occurred. Simultaneously, the counter Z2 is supplied with the read-out pulses. The counter Z2 now counts in the reverse direction, proceeding from the maximum counter reading which was reached during write-in of the data signal words into the memory RAM.

Read-out of the data signal words, and the simultaneous attachment of the two identifier bits, is continued by constantly changing the counts of the counters Z1 and Z2, until the count of the counter Z2 reaches a count of "0" (the initial counter reading). This means that all storage cells of the memory RAM which had previously been written with data signal words have now been read-out. When the counter reading "1" is reached, the aforementioned identifier bit indicating the end of a data signal block is set to a prescribed binary state, for example the logic state "0," in response to a signal emitted by the AND element G6. As a result thereof, the data signal word transferred into the register Reg5 at this time is identified as the last data signal word belonging to the data signal block.

When the initial counter reading "0" of the counter Z2 is reached, the AND element G3 is transferred to an inhibited state, so that the two counters Z1 and Z2 are not supplied with further read-out pulses. The setting of the end block identifier bit also effects resetting of the trigger circuit FF1 to its inactive condition, via the trigger circuit FF2. As a result of the inactive state of the trigger circuit FF1, the transmit authorization signal receiver SBS and the microprocesser MP are informed of the end of a transmit event. The transmit buffer SP is then available for accepting and forwarding a further data signal block.

FIG. 4 shows the structure of the means for the reception of a transmit authorization signal SBS. This includes an RS trigger circuit FF3 whose setting input S is connected to an output of an AND element G7 which negates an output signal. This AND element G7 has one input connected to the line SBE' carrying the transmit authorization signal and has a further input connected to the line SA', the latter also conducted to the reset input of the trigger circuit FF3. Both lines are also connected to inputs of an AND element G8, whereby the input connected to the line SA' negates the input signal supplied to it. At its output side, this AND element G8 is connected to an input of a OR element Gg. A further input of this OR element is in communication with the output of a one-shot multivibrator MV which in turn has its input side connected to the output of the RS trigger circuit FF3. The lines SL1 and an input of a further AND element G10 are also connected to this output. This AND element is supplied with clock pulses T at a further input. At its output side, this AND element is connected to the line RF (FIG. 3).

The arrangement shown in FIG. 4 always immediately forwards a transmit authorization signal appearing on the line SBE' to the output register Reg4 shown in FIG. 2 via the AND element $G^8$ and the OR element $G^9$ when the trigger circuit FF1 is in its inactive condition, i.e. when the microprocessor MP has not previously output a transmit request signal. When, by contrast, the trigger circuit FF1 is in its active condition, the transmission path is inhibited for the transmit authorization signal. Upon arrival of a transmit authorization signal, the trigger circuit FF3 is switched into its active condition in which the clock pulses T for the read-out of a data signal block stored in the write/read memory RAM appear at the output of the AND element G10. A control signal is emitted to the data selector DW1 (FIG. 2) via the line SL1 in this condition.

The resetting of the trigger circuit FF1 into its inactive condition after the transmission of a data signal block causes the trigger circuit FF3 to be also switched into its inactive condition. Upon this switching, the one-shot multivibrator MV following the trigger circuit FF3 emits an output signal of a prescribed duration which is forwarded via the OR element Gg as a transmit authorization signal.

FIG. 5 shows the structure of the reception buffer arrangement EP. For the address comparison, this arrangement includes a comparator arrangement Vg1 connected to the data signal outputs of the input register Reg1 (FIG. 2). The comparator arrangement Vg1 emits a setting signal to a trigger circuit FF4 given coincidence of the addresses compared to one another. The output side of this trigger circuit FF4 is in communication with an input of an AND element G11. At a further input, this AND element G11 is supplied with the clock pulses T as write pulses. A write pulse input of a memory F1F0 is connected to the output of this AND element G11. The memory F1F0 for example, is an intermediate storage which has its data signal outputs connected to the data bus DB. Given the presence of a setting signal for the trigger circuit FF4, the data signal block is transferred word-by-word into this intermediate storage F1F0, with the assistance of the clock pulses T transmitted via the AND element G11. The transfer of data signal words thereby ensues until the trigger circuit FF4 is reset to its inactive condition by the appearance of an end identifier indicating the end of the data signal block. For this resetting, the trigger circuit FF4 at the input of the intermediate storage F1F0 is connected to the line EK carrying the end identifier. This line is also connected to a further trigger circuit FF5 which, in response to the appearance of the end identifier, emits the control signal indicating the readiness of a data signal block to the microprocessor MP. The read-out of a data signal block from the intermediate storage F1F0 need not be discussed in greater detail. This read-out ensues in a known way by supplying corresponding control signals via lines of the control bus SB. The read-out is ended with the appearance of a signal indicating the empty condition of the intermediate storage F1F0. The microprocessor MP receives this signal supplied from the intermediate storage F1F0, for example in the form of a control signal, via the control bus SB, or as an interrupt signal at an interrupt input.

The input of the intermediate storage FIF0 is connected to a means SB for checking received data signal blocks. This means SB checks received data signal blocks with respect to their fault-free transmission, for example in the form of a parity check. It thereby modifies the acknowledgement signal contained in a received data signal block which was prepared by the transmitter, in accord with the check result, and it subsequently emits this modified acknowledgement signal to the register Reg3, together with the address identifying the transmitter of the data signal block just received and together with the end identifier.

The intermediate storage F1F0 is also preceded by a data selector DW2. This data selector DW2 is controlled by the comparator arrangement Vg1. It conducts data signal words belonging to a data signal block to the intermediate storage only when the comparator arrangement Vg1 has identified a coincidence of the addresses compared to one another. Otherwise, the overall, received data signal block is forwarded to the appertaining ring conductor arrangement, via the data selector DW1 shown in FIG. 2 and via the output register Reg4.

The above description discussed only the attachment of two identifier bits respectively signifying the start and end of a data signal block as the auxiliary information. It is also possible, in accordance with the inventive concept disclosed herein, to attach further auxiliary information to the individual data signal words, which auxiliary information is also derived from the counter readings of the two counters Z1 and Z2.

In FIGS. 2 and 5, two separate address decoders, namely the address decoder DEC and the comparator arrangement Vg1, are provided for the reception of acknowledgement signals and data signal blocks in the control devices. Instead of these two address decoders, however, a single address decoder can be employed, which, in addition to being supplied with the lines carrying the addresses, is also supplied with lines carrying the start identifier and end identifier, for the recognition of acknowledgement signals and data signal blocks.

Although modifications and changes may be suggested by those skilled in the art it is the intention of the inventor to embody within the patent warranted hereon all changes and modifications as reasonably and properly come within the scope of their contribution to the art.

We claim as our invention:

1. A data transmission system for transmitting data via a clock-controlled loop operated directionally dependent among a plurality of control devices connected to said loop, each control device including:
   means for forwarding a transmit authorization signal around said loop from control device to control device;
   means for receiving said transmit authorization signal for generating a signal placing the control device receiving said transmit authorization signal in a transmit authorization mode;
   means for compiling data signals to be transmitted in the form of a data signal block having at least one data word of a prescribed number of bits, a receiver address attached to said data word identifying another control device intended to receive said data signal block, and a sender address attached to said data word identifying the control device transmitting said data signal block; and
   a transmit buffer means for attaching auxiliary information to said data signal block and emitting the data signal block with said auxiliary information to said loop, said transmit buffer including
      a write/read memory having a plurality of storage cells for accepting a compiled data signal block word-by-word,
      a counter means connected to said write/read memory, proceeding from an initial count and based on a first changing count which changes controlled by a write-in clock corresponding to the operating speed of said means for compiling, continually addresses said storage cells for word-by-word acceptance of said data signal block in said write/read memory, said first changing count stopping at a maximum count corresponding to the length of said data signal block, and said counter means further, in response to said signal from said means for receiving said transmit authorization signal, proceeding from another initial count and based on a second changing count controlled by a read-out clock corresponding to the operating speed of said loop, enabling word-by-word read-out of said data signal block from said write/read memory until said second changing count reaches also a maximum count,
      a register for accepting the data signal block read from said write/read memory and attaching said auxiliary information thereto, and
      means connected to said counter means and to said register for deriving said auxiliary information from selected counts of said counter means.

2. A system as claimed in claim 1, wherein said auxiliary information includes a block start identifier bit signifying a beginning of said data signal block and a block end identifier bit signifying the end of said data signal block, and wherein said means for deriving said auxiliary information from selected counts of said counter means generates a bit having a selected binary status forming said block start identifier bit simultaneously with said initial count, and generates another bit having a selected binary status forming said block end identifier bit its appearance being defined by said other initial count.

3. A system as claimed in claim 2, wherein said counter means comprises:
   a first counter connected to said write/read memory for continually addressing said memory with an incremental count controlled by said write-in clock proceeding from said initial count which causes the setting of said block start identifier bit into said selected binary status until reaching the end of said data signal block thereby defining the first mentioned maximum count;
   means for thereafter resetting said first counter to said initial count; and
   a second counter which increments its count simultaneously with said first counter proceeding from said other initial count until reaching the second mentioned maximum count, and which, upon the occurrence of said signal from said transmit authorization signal receiver, decrements in an opposite direction controlled by said read-out clock effecting read-out of said write/read memory until again reaching said other initial count, said second counter being connected to said first counter for deactivating said first counter upon reaching said other initial count and said second counter, upon again reaching said other initial count, generating a signal for setting said block end identifier bit to said selected binary status.

4. A system as claimed in claim 3, wherein said initial count and said other initial count and the first and second mentioned maximum count are identical.

5. A system as claimed in claim 3, wherein said register includes a first cell for said block start identifier bit and a second cell for said block end identifier bit, and wherein said counter means further includes:
  a first gate having an input connected to said first counter and an output connected to said first cell of said register for generating said signal for setting said block start identifier bit to said selected binary status upon emission of said initial count by said first counter; and
  a second gate having an input connected to an output of said second counter and an output connected to said second cell of said register, said second gate generating said signal for setting said block end identifier bit to said selected binary status upon the occurrence of said other initial count at said input of said second gate.

6. A system as claimed in claim 1, wherein said means for compiling is a microprocessor having memory capability.

7. A method for transmitting data among a plurality of control devices connected via a clock-controlled loop operated directionally dependent comprising the steps of:
  forwarding a transmit authorization signal around said loop from control device to control device;
  generating a signal in each control device upon receipt of said transmit authorization signal placing the control device receiving the transmit authorization signal in a transmit authorization mode;
  compiling data signals to be transmitted in the form of a data signal block having at least one data word of a prescribed number of bits, a receiver address attached to said data word identifying another control device intended to receive said data signal block, and a sender address attached to said data word identifying the control device transmitting said data signal block;
  storing said data signal block in a write/read memory under the control of a first counter proceeding from an initial count and incrementing controlled by pulses from a write-in clock corresponding to the speed of compiling said data signals;
  stopping said first counter at a maximum count corresponding to the length of said data signal block when said data signal block is entirely stored in said write/read memory;
  simultaneously incrementing a second counter proceeding from another initial count with said incrementing of said first counter until said second counter also reaches a maximum count;
  supplying said signal indicating receipt of said transmit authorization signal to said second counter and thereupon decrementing said second counter controlled by a read-out clock corresponding to the operating speed of said loop;
  reading out said write/read memory for transferring the contents thereof to a register under the control of the decrementing of said second counter until said second counter again reaches said other initial count; and
  deriving auxiliary information bits from selected counts of said first and second counters and attaching said auxiliary information bits to said data signal block in said register before emission thereof to said loop.

8. A method as claimed in claim 7, comprising the additional step of resetting said first counter to said initial count after said first counter reaches said maximum count.

9. A method as claimed in claim 7, wherein said auxiliary information bits includes a block start identifier bit and a block end identifier bit, and wherein the step of generating said additional information bits is further defined by the steps of:
  setting a cell in said register for said block start identifier bit to a selected binary status upon the emission following reset from said first counter of said initial count; and
  setting another cell in said register for said block end identifier bit to a selected binary status upon the emission by said second counter of said other initial count following decrementing of said second counter.

10. A method as claimed in claim 7, wherein said initial count and said other initial count and the first and second mentioned maximum count are identical.

* * * * *